United States Patent [19]

Graham

[11] 3,929,659

[45] Dec. 30, 1975

[54] CROSSLINKED RUBBER/RESIN BINDERS FOR CHROMIUM DIOXIDE RECORDING MEMBERS

[75] Inventor: Boynton Graham, Wilmington, Del.

[73] Assignee: E. I. Du Pont de Nemours & Company, Wilmington, Del.

[22] Filed: June 18, 1973

[21] Appl. No.: 370,713

[52] U.S. Cl. ........... 252/62.54; 117/235; 260/37 N; 260/37 EP; 260/40 R; 260/40 TN; 260/42.53

[51] Int. Cl.$^2$ ...................... H01F 1/113; H01F 1/28

[58] Field of Search.................. 252/62.54; 117/235

[56] References Cited

UNITED STATES PATENTS

| | | | |
|---|---|---|---|
| 3,149,995 | 9/1964 | Bauer | 252/62.54 |
| 3,150,995 | 9/1964 | Bauer | 252/62.54 |
| 3,216,846 | 11/1965 | Hendricx et al. | 252/62.54 |
| 3,558,353 | 1/1971 | Harada et al. | 252/62.54 |
| 3,558,492 | 1/1971 | Proskow | 252/62.54 |
| 3,574,684 | 4/1971 | Higashi | 252/62.54 |
| 3,585,141 | 6/1971 | Ingersoll | 252/62.54 |
| 3,597,273 | 8/1971 | Akashi et al. | 252/62.54 |
| 3,649,541 | 3/1972 | Ingersoll | 252/62.54 |
| 3,681,137 | 3/1971 | Nagazono | 252/62.54 |
| 3,689,317 | 9/1972 | Akashi et al. | 252/62.54 |
| 3,740,266 | 6/1973 | Akashi et al. | 252/62.54 |

*Primary Examiner*—Arthur P. Demers

[57] ABSTRACT

Magnetic recording compositions and elements, e.g., tapes, containing ferromagnetic chromium dioxide particles dispersed in a binder which comprises a preformed elastomer, a preformed hard resin, a polyol, and a polyfunctional hydroxyl-reactive compound. The elements have long wear life and excellent running characteristics in magnetic recording applications.

23 Claims, No Drawings

CROSSLINKED RUBBER/RESIN BINDERS FOR CHROMIUM DIOXIDE RECORDING MEMBERS

BACKGROUND OF THE INVENTION

1. Field of the Invention

This invention relates to magnetic recording compositions and members, e.g., magnetic tapes, and particularly to new and improved binder formulations for such compositions and members.

2. Description of the Prior Art

The preparation of ferromagnetic chromium dioxide and its use as the magnetic component of magnetic recording members is known, for example, in U.S. Pat. Nos. 2,956,955, 3,278,263, 3,512,930, and 3,649,541. Likewise, a large number of patents disclose a variety of binder compositions proposed for use with iron oxides, chromium dioxide, magnetic alloys, or other magnetic components. The following are representative: (a) preformed elastomers in combination with preformed hard resins in U.S. Pat. Nos. 2,607,710 and 3,144,352, (b) elastomer, hard resin and isocyanate in U.S. Pat. Nos. 2,989,415 and 3,366,505, and (c) polyol in combination with isocyanate, with or without the presence of hard resin, in U.S. Pat. Nos. 3,149,995, 3,150,995 and 3,411,944. Continuing advances in the recording art, particularly in high-speed instrumentation recording and helical scan video recording, have placed increasingly stringent demands on magnetic recording media and created the need for still further improved magnetic compositions with superior abrasion resistance, freedom from blocking, low friction, and the like. The present invention deals with such compositions that have high stability of magnetic characteristics, excellent wear resistance, and outstanding running characteristics on magnetic recording and reproducing equipment.

SUMMARY OF THE INVENTION

This invention relates to magnetic compositions, and to magnetic recording elements made therefrom, comprising ferromagnetic chromium dioxide particles dispersed in a polymeric resin binder that comprises a mixture of a preformed elastomer, a preformed hard resin, a polyol and a polyfunctional hydroxyl-reactive compound.

The invention also relates to a process for making such compositions comprising admixing the ferromagnetic chromium dioxide particles, the preformed elastomer, the preformed hard resin, the polyol, the polyfunctional hydroxyl-reactive compound, and optional other ingredients, wherein reaction of the polyol and the polyfunctional hydroxyl-reactive compound occurs after admixture with the other ingredients, and preferably after final shaping of the magnetic recording member.

The magnetic compositions and elements of this invention possess high magnetic sensitivity, efficiency and stability in combination with excellent mechanical properties, particularly long wear life and outstanding running characteristics. They are useful for a variety of magnetic recording applications, e.g., in tapes, discs and drums for audio, video, instrumentation and computer uses, for control equipment, and as magnetic cores.

DESCRIPTION OF THE PREFERRED EMBODIMENTS

For the magnetic component of the ferromagnetic compositions and elements of this invention, there may be used any of the particulate ferromagnetic chromium dioxide materials known in the art. The chromium dioxide particles may, if desired, include modifying elements in their crystal structure. Suitable chromium dioxide materials, their magnetic properties, and methods for preparing them are described in a number of patents, among which are U.S. Pat Nos. 2,885,365, 2,923,683, 2,923,684, 2,923,685, 2,956,955, and 3,034,988. A preferred material is acidular ferromagnetic chromium dioxide having a tetragonal crystal structure of the rutile type, with a mean particle length not greater than 10$\mu$m and with no more than 10% of the particles having a length greater than 10$\mu$m, as described in U.S. Pat. No. 3,278,263. The initial particles may be treated to improve the level and stability of their magnetic characteristics as described in U.S. Pat. Nos. 3,512,930 and 3,529,930. The magnetic compositions and elements of the invention can contain 1 to 98% and preferably 65 to 85% by weight of ferromagnetic chromium dioxide particles.

For the preformed elastomer, there may be used any natural or synthetic organic polymeric material that meets the requirements of the rubbery state as defined at pages 190 and 515ff. in Schmidt and Marlies, "Principles of High Polymer Theory and Practice," McGraw-Hill Book Company, Inc., New York (1948), i.e., it must be a high polymer that is in an amorphous state and above its second-order transition temperature at room temperature. Suitable materials include natural rubber, butadiene/acrylonitrile copolymers, block copolymers of butadiene/styrene, polychloroprene, and chlorosulfonated polyethylene. For convenience, it is preferred to use elastomers that are soluble at room temperature in common solvents. Because of their outstanding toughness, as especially useful and preferred group of elastomers are the polyurethanes, and particularly the preformed, nonreactive polyesterpolyurethanes such as are described, for example, in U.S. Pat. No. 2,871,218. Particularly preferred for the magnetic compositions and elements of this invention are (a) butadiene/acrylonitrile copolymers and (b) the commercially available, preformed, nonreactive organosoluble polyester polyurethane resins based on diphenylmethane diisocyanate, adipic acid, and an alkanediol having 2–4 carbon atoms, e.g., ethylene glycol, propanediol and butanediol, or mixtures of such alkanediols. Also suitable are preformed, nonreactive polyetherpolyurethane elastomers. In the magnetic compositions of this invention, the preformed elastomer may comprise 10–60%, preferably 15–40%, by weight of the total binder of the composition, i.e., that portion exclusive of the ferromagnetic chromium dioxide particles and exclusive of any substrate that may be employed.

For the preformed hard resin there may be used any nonelastomeric, macromolecular, film-forming organic polymer. As will be understood by those familiar with the art, the term "hard resin" is used herein to connote such polymers having a glass transition temperature ($T_g$) higher than the temperatures to which the polymer will be exposed in use. Both thermosetting and thermoplastic resins may be used in the compositions and elements of this invention, but the thermoplastic resins are preferred for convenience and because they are more adaptable to certain aftertreatments that may frequently be desirable in the manufacture of magnetic recording elements, e.g., calendering. It is also desirable that the hard resin be soluble at room temperature in common solvents. Among the materials that can be used are: epoxy and phenoxy resins; polycarbonates; polyesters; polyacrylic and polymethacrylic acids and esters thereof; cellulose ethers and esters; styrene polymers and copolymers; polyamides; vinyl polymers and copolymers; vinylidene polymers and copolymers; copolymers of two or more vinyl, vinylidene or acrylic monomers, as well as mixtures thereof. Also, mixtures of two or more hard resins may be used to make up the total hard resin component of the composition. Particularly preferred materials, in part because of their low cost, good compatibility and ready availability, are vinylidene chloride/acrylonitrile and vinyl chloride/vinyl acetate copolymers. In the magnetic compositions of this invention, the preformed hard resin may comprise 25–70%, preferably 30–60%, by weight of the total binder portion of the composition, as previously defined.

For the polyol, there may be used any organic compound having two or more available reactive hydroxyl groups. Suitable compounds include the linear or branched aliphatic diols and triols, such as ethylene glycol, butanediol, glycerol, and trimethylol propane. Also suitable are aromatic compounds with available reactive hydroxyl groups, including those having at least two such groups attached directly to the aromatic nucleus, e.g., hydroquinone. More preferred, because their higher molecular weight contributes to hard, tough binders, are any of a number of polymeric carboxylic esters. Such materials are made by reacting aliphatic diols or triols with aliphatic or aromatic dicarboxylic acids or mixtures thereof under such conditions that there is an excess of hydroxyl groups. The resulting polymeric carooxylic esters may have molecular weights in the range of 200 to 30,000 or more, with hydroxyl numbers in the range of 1 to 500. Many such materials are available commercially; methods for their preparation are known to those skilled in the art and do not form a part of thee present invention. The polyol component may constitute 1–25%, preferably 2–15%, by weight of the binder portion of the magnetic compositions of this invention.

It will be understood that some materials that may be used primarily as the hard resin component of the compositions of this invention may play a secondary role as a portion of the polyol component. thus, for example, two hydroxyl-terminated polyesters may be used, one of high molecular weight and low hydroxyl number serving fundamentally as hard resin and another of lower molecular weight and higher hydroxyl number serving primarily as polyol. Similarly, a particularly preferred material for the hard resin component is a commercially available partially saponified vinyl chloride/vinyl acetate copolymer having available pendant reactive hydroxyl groups. When this copolymer is used as the hard resin, an additional polyol with a higher proportion of available reactive hydroxyl groups will also be used with it.

As the polyfunctional hydroxyl-reactive compound there may be used a material selected from polyepoxides, polycarboxylic acids, and polyanhydrides, as representative classes of compounds. Especially preferred materials for this component are the polyfunctional isocyanates because they provide a convenient reaction rate with the polyol, such that the reaction does not proceed appreciably while the composition is in solution but will occur in a usefully short period of time at room temperature or at moderately elevated temperature after the composition has been coated or otherwise formed into a magnetic recording member. Representative useful and preferred polyfunctional isocyanates are: hexamethylene diisocyanate; diphenylmethane diisocyanate; diphenylmethane triisocyanate; toluene diisocyate; polyethylene polyphenylisocyanate; the $C_{36}$ diisocyanate from linoleic dimer acids; and, as particularly preferred materials (a) 4,4'-methylene-bis-(cyclohexylisocyanate), and (b) the product of 2,4-toluene diisocyanate and trimethylolpropane reacted in ratios in the range 3/1–5/2. The polyfunctional hydroxyl-reactive component may comprise 2.5–30%, preferably 3–25%, by weight of the binder portion of the magnetic composition.

The reaction product of the polyol and the polyfunctional hydroxyl-reactive compound may constitute 3.5 to 55%, preferably 5 to 40%, by weight of the binder portion of the magnetic composition in its final form.

In addition to the foregoing, the compositions of the invention may also include other ingredients commonly employed in magnetic recording materials, such as dispersing agents, lubricants, antistatic agents, fungicides and the like. The additives should not interfere with the reaction of the polyol and the polyfunctional hydroxyl-reactive compound, that is, they should not contain reactive groups capable of reacting with either the polyol or with the polyfunctional hydroxyl-reactive compound, such as, for example, hydroxyl, carboxyl, amino and substituted amino groups. A wide variety of suitable materials and amounts is within the skill of one familiar with this art.

The compositions of the invention are illustrated by the examples hereinafter, wherein parts and percentages are given by weight unless otherwise specified, and are discussed in terms of the final dry magnetic composition, i.e., ferromagnetic chromium dioxide particles, preformed elastomer, preformed hard resin, polyol, polyfunctional hydroxyl-reactive compound, dispersing agent, lubricant, plus any other ingredients, but exclusive of any substrate that may be employed. It will be understood, however, that the compositions may initially be made up from solutions of the various components where it is not feasible to use a given component, e.g., the preformed elastomer, in its undissolved form. The solvent content of a given composition is, of course, evaporated in the course of putting the composition into the form of a useful magnetic recording member. The choice of solvent will be governed by the solubility characteristics of the elastomer, the hard resin, the polyol, the polyfunctional hydroxyl-reactive compound, dispersing agents, lubricants and other materials selected for the composition. The solvent should be nonreactive with the polyol, the hydroxyl-reactive compound, and any other ingredients. Representative solvents for the preferred resins and other components of the compositions of this invention are acetone, cyclohexanone, methyl ethyl and methyl isobutyl ketones, tetrahydrofuran, and toluene. Mixtures of two or more solvents can be used.

In preparing the magnetic compositions of the invention, the procedures commonly used in the art may be employed, the only requirement according to the present invention being that the polyol and the polyfunctional hydroxyl-reactive compound should not be separately mixed together before they are admixed with the other components. Preferably, the ferromagnetic chromium dioxide particles, the preformed elastomer, the preformed hard resin, the polyol, and any desired dispersing agents, lubricants and other optional ingredients should be thoroughly mixed before addition of the polyfunctional hydroxyl-reactive compound. This sequence prevents premature reaction of the polyol with the polyfunctional hydroxyl-reactive compound in a way that would interfere with thorough mixing of the other components and lead to subsequent nonuniformities in the composition and in magnetic recording members made from it. Suitable mixing procedures include, but are not limited to, ball milling, pebble milling, sand milling, and sand shaking. Typical useful procedures are described, for example, in U.S. Pat. No. 3,649,541. After sufficient mixing and milling, the composition may be filtered, deaerated, and adjusted to desired final viscosity by addition of solvent.

The conventional procedures known in the art may also be used to cast the compositions to form self-supporting films to serve as integral magnetic recording members, or to coat the compositions, e.g., by means of a doctor knife, on any suitable base material to form supported magnetic recording members. Other suitable coating procedures include roller coating and gravure coating techniques known to those skilled in the art. Suitable base materials are mentioned in U.S. Pat. No. 3,649,541 along with such suitable aftertreatments as magnetic orientation of the particles, calendering, and aging. The pertinent desscriptions from that patent are incorporated herein by reference.

The magnetic recording members of the examples were tested for a number of their more significant magnetic and mechanical performance characteristics according to the following procedures:

Blocking

This test is performed according to Interim Federal Specification W-T-0070 (U.S. Navy, Bureau of Ships), Apr. 26, 1963, Section 4.4.8. In this test, a number of layers of tape are wound around a mandrel, secured in position, and exposed for a given time to specified conditions of temperature and humidity. The values recorded are either (a) the number of inches of tape that must be unwound before further unwinding will proceed unassisted, or (b) the number of revolutions of tape that spontaneously spring away from the mandrel when the restraining force is released.

Coefficient of Friction

This laboratory test is considered to be indicative of the runnability of a magnetic tape in use on tape transport mechanisms. The test is run at 75°F. and 50% relative humdity. The magnetic coating side of a magnetic tape is placed in 180°-arc contact with a stainless steel mandrel having a diameter of 1.5 inches, and a strain-gauge apparatus is used to determine the coefficient of friction when the tape is moved over the mandrel at a velocity of 1.8 inches per minute under a load of 234.7 g per 0.5 inch of tape width. For convenience, this property will be reported in the examples and accompanying tables simply as "Friction," but it is to be understood that the numbers are the dimensionless units of "Coefficient of Friction."

Head Wear

This test measures the abrasiveness of a magnetic tape and indicates its runnability on magnetic recording and reproducing equipment. A sample of tape is run on a commercial helical-scan video recorder (Sony CV-2000, Sony Corp. of America) modified to operate at a head/tape velocity of 860 inches per second and with the standard heads replaced by thin shims made of alfesil (alloy of Fe = 845%, Al = 5.5%, Si = 10.0%). A sensitive mechanical gauge is used to measure the depth of material worn from the shims. Results are reported as actual wear in μm or as wear rate in μm per hour.

Output

Saturation output at a wavelength of 80 microinches is measured on a tape transport having record and reproduce heads like those on the Ampex FR-1400 transport (Ampex Corp., Redwood City, Calif.) at a tape speed of 15 inches per second and a signal frequency of 187.5 kHz. The output in decibels is compared with that of a high-quality commercial iron oxide tape, and the difference (+ or −) is recorded as the output value of the test tape, e.g., a value of +2 signifies that the test tape had 2 db. greater output than the reference standard tape. It must be kept in mind that this is a relative rather than an absolute test. A sample with an output value of − 2db. is thus somewhat less efficient magnetically than the best commercial iron oxide tape used as a standard, but is still substantially superior to ordinary commercial iron oxide tapes, for which the output values may be −5 db. to −10 db. as compared with the same standard.

Runnability

Results reported under this heading represent a qualitative assessment of performance on conventional video recording and reproducing equipment. Observations are made at temperatures of 45° C. and 85° C., as representative of conditions likely to be encountered in normal operation, both for constant-running performance and for start-stop performance, i.e., the ease with which the tape sample resumes full-speed operation from repeated stops. Results are reported in a scale of A = very good, B = good, C = poor, D = very poor. Constant-running results are given first; start-stop results are given second. For example, a rating of "Hot = A/C" indicates that at 85° C. the sample performed very well in the constant-running mode but only poorly when there were repeated stops.

Signal/Noise (S/N)

This measure of merit provides an indication of overall magnetic performance that takes into account such factors as the nature and characteristics of the ferromagnetic particles, the efficiency and uniformity of their dispersion in the binder, tthe nature and quality of the final coating (e.g., hard or soft, dense or spongy), the positive or negative effects of binder components, the effect of such aftertreatments as calendering and curing, and the like. As used herein, it provides a useful tool for comparing a number of compositions under similar test conditions. The test method involves comparing the output of an 80μ inches saturated signal, as described above, with the output signal from a sample of the same tape that has had no input signal, to obtain the signal/noise ratio expressed in db. The same kind of determination is then made on a reference tape of known high quality. The S/N ratios of the test tape and the standard tape are then compared. The values given for "S/N" in the examples hereinafter are, therefore, not the S/N ratios themselves but the difference between test tape S/N and standard tape S/N, expressed in db. For example, if a test tape had an S/N ratio of 65 db. and the standard tape had an S/N ratio of 60 db., the reported "S/N" would be given as +5 db.

Stability

The stability of the magnetic characteristics of a magnetic recording member is determined by measurement of residual intrinsic flux density $\Phi_r$, of a sample of the member when fresh and again after aging. The measurement is made on a DC ballistic-type magnetometer that is a modified form of the apparatus described by Davis and Hartenheim in *Review of Scientific Instruments*, 7, 147 (1936). Since the rate of degradation of magnetic properties is generally slow at normal room conditions, it is usually desirable to accelerate the test by aging the magnetic recording member at elevated temperature and humidity. Experience has shown that one day of aging at 65°C., 50% RH produces degradation equivalent to that found after about one year of aging under normal storage conditions. The stability data in the examples are all for samples aged at 65°C., 50% RH and are reported as either $D_7$, the percent loss in $\Phi_r$ after 7 days of aging, or as $t_{10}$, the number of days of aging at which $\Delta\Phi_r = -10\%$.

Still Frame Life

This test reports the time in minutes or hours before clogging of the reproduce head occurs when a magnetic tape is run in still-frame mode on a helical-scan video playback machine (Panasonic NV8100, Matsushita Electric Industrial Co., Ltd.).

Tape Wear

Two tests are employed to indicate mechanical degradation of a tape in use, as follows:

a. Gross wear. This test records the rate of degradation of the coating in micro-inches per minute for a loop of magnetic recording tape running against phosphor bronze shims under conditions adjusted so that a high-quality commercial standard tape wears at a rate of 1.0 $\mu$/min.

b. One-meter wear. In this test, a strip of tape one-half inch wide and one meter long is passed back and forth over the head of a helical-scan video recorder modified to provide automatic cycling of the sample tape. At the start of the test, a 3.5$\mu$m saturated signal is recorded on the tape. With the recorder in playback mode, the strength of the output signal is measured initially and after 500 passes of the sample over the head. Results are reported in terms of percent of original signal retained. High signal retention is taken as indicative of good wear resistance, i.e., little loss of coating because of wear.

The examples that follow illustrate the invention.

EXAMPLE 1

This composition employed 12.0 g of ferromagnetic chromium dioxide, prepared by the procedures of U.S. Pat. No. 3,278,263 and aftertreated by the procedures of U.S. Pat. No. 3,512,930, and having the physical and magnetic characteristics defined in those patents. The chromium dioxide was lightly ground to break up lumps, then mixed in a beaker with 125 g of 20–30 mesh Ottawa sand, 0.24 g of olive oil, 0.15 g of isopropyl myristate, 0.12 g of N-tallow trimethylene diamine dioleate, and a quantity of cyclohexanone/toluene (2/1) sufficient to provide good milling action. This mixture was milled for 40 minutes by the action of a stirring disc having a diameter of 2.5 inches and rotating at about 1700 rpm. There were then added 1.2 g of a commercially available butadiene/acrylonitrile (80/20) copolymer [12.0 g of a 10% solution in cyclohexanone/toluene (2/1)], 3.0 g of a commercially available vinyl chloride/ vinyl acetate/vinyl alcohol (91/3/6) copolymer [12.0 g of a 25% solution in cyclohexanone/toluene (2/1)], and 0.3 g of a commercially available hydroxyl-terminated polyester, an essentially linear reaction product of diols and dibasic acids having a hydroxyl number of 41–47 and M.W. of about 2500. After another 15 minutes of milling, there was added 0.6 g [0.8 g of 75% solution in cyclohexanone/toluene (2/1)] of the reaction product of about 3 moles of 2,4-toluene diisocyanate with about 1 mole of trimethylol propane, and milling was continued for an additional 5 minutes. The dispersion thus formed was filtered through a cloth pad supported on a screen having a 2-micron filter rating, deaerated and coated by means of a doctor knife on a polyethylene terephthalate film base. While the coating thus formed was still fluid, the coated film was passed between opposing magnets having an orienting magnetic field strength of 900 gauss to align the ferromagnetic chromium dioxide particles in the coating. The oriented layer was dried at room temperature. The dry layer was calendered between a cotton-filled roll and a polished chrome-plated steel roll having its surface at a temperature of about 105° C. at a pressure of about 1100 pounds per linear inch, with the coated side of the film in contact with the polished steel roll.

The composition of the dry magnetic coating, exclusive of the polyethylene terephthalate supporting film, was 68% by weight chromium dioxide and 32% by weight total binder. The composition of the binder portion alone by weight was:

| | |
|---|---|
| Preformed elastomer (butadiene/acrylonitrile) | 21.4% |
| Hard resin (vinyl terpolymer) | 53.5% |
| Polyol (hydroxyl-terminated polyester) | 5.3% |
| Hydroxyl-reactive compound (isocyanate-terminated reaction product of 2,4-toluene diisocyante/ trimethylolpropane) | 10.7% |
| Dispersant (N-tallow trimethylene diamine dioleate) | 2.1% |
| Lubricants | 7.0% |
| Isopropyl myristate - 2.7% | |
| Olive oil - 4.3% | |

The magnetic recording member thus produced had the following characteristics:

| | |
|---|---|
| Blocking | 11 revolutions |
| Gross wear | 4.3 $\mu$''/min. |
| Output | −3.9 db. |
| Stability | $t_{10}$ = 13 days |

EXAMPLE 2

In a porcelain jar with a capacity of about 1500 ml there were placed:

a. 175 ml of tetrahydrofuran, b. about 220 ml of one-half-inch diameter ceramic balls, c. 94 g of chromium dioxide, and d. 3.76 g of soya lecithin.

The jar was capped and the ingredients were ball-milled for three days at room temperature. To the contents of the jar were then added:

e. 0.28 g of stearamide, f. 13.325 g dry basis (88.8 g of a 15% by weight solution in tetrahydrofuran) of commercially available polyesterpolyurethane resin from 1,4-butanediol, adipic acid, and diphenylmethane diisocyanate, g. 13.325 g dry basis (44.4 g of a 30% by weight solution in tetrahydrofuran) of commercially available vinylidene chloride/ acrylonitrile (80/20) copolymer, h. 3.25 g dry basis (22.0 g of a 15% by weight solution in tetrahydrofuran) of a commercially available polymeric carboxylic ester having a molecular weight of about 20,000 and a hydroxyl number of about 10, the reaction product of ethylene glycol with a mixture of aliphatic and aromatic dibasis acids (40/40/10/10-terephthalic/isophthalic/ sebacic/adipic), i. 1 ml of amyl alcohol, and j. 440 ml ceramic balls.

The jar was again capped and the ingredients were ball-milled for 4 days at room temperature. There were then added:

k. 2.60 g dry basis (13.0 g of a 20% by weight solution in an 82/18 mixture of tetrahydrofuran/ methyl isobutyl ketone) of the polyfunctional isocyanate of Example 1, and l. 10 ml of tetrahydrofuran.

The contents of the jar were stirred for an hour, diluted by addition of 33 ml of tetrahydrofuran, stirred again, and filtered.

The composition thus prepared was used to prepare a magnetic tape by the coating, magnetic orienting, calendering, and drying procedures of Example 1. The composition of the tape, exclusive of the substrate, was 72% by weight chromium dioxide and 28% by weight total binder. The composition of the binder portion alone was:

| | |
|---|---|
| Preformed polyurethane | 36.5% |
| Polyester polyol | 8.9% |
| Polyfunctional isocyanate | 7.1% |
| Vinylidene chloride copolymer | 36.5% |
| Soya lecithin | 10.3% |
| Stearamide | 0.8% |

In the gross wear test, this tape had a wear rate of 0.022$\mu$inch/min., substantially superior to the wear rate of prior art tapes. The tape also displayed good runnability on conventional tape transport equipment.

EXAMPLES 3–4

Examples 3 and 4 illustrate other compositions of this invention in comparison with Control A, a composition representative of the prior art. In all of these compositions, the ratio of preformed elastomer to hard resin was also 1/1, as in Example 2, and tetrahydrofuran was essentially the sole solvent. In Example 3 and Control A, the ferromagnetic chromium dioxide was made according to U.S. Pat. No. 3,278,263 but was not aftertreated; in Example 3, the chromium dioxide was also made according to U.S. Pat. No. 3,278,263 and was then aftertreated according to U.S. Pat. No. 3,512,930.

Example 3 and Control A were prepared from basically the same materials as, and by procedures substantially identical to, those used for Example 2, except that the stearamide and the amyl alcohol were omitted. Also, the amounts of some of the ingredients were slightly different, viz., (a) 15..3 g on dry basis (101.5 g of 15% solution in tetrahydrofuran) of the polyester-polyurethane resin, (b) 15.3 g on dry basis (50.95 g of 30% solution in tetrahydrofuran) of the vinylidene chloride/acrylonitrile copolymer, and (c) 2.48 g on dry basis of the polyfunctional isocyanate of Example 1. Further, in place of the polymeric carboxylic ester of Example 2, the polyol component in Example 3 was hydroquinone, incorporated to the extent of 6% by weight on the weight of the chromium dioxide. No polyol was included in Control A.

The composition of Example 4 employed the same preformed elastomer, hard resin, and isocyanate-terminated hydroxyl-reactive compound, but used glycerol rather than hydroquinone as the polyol. Also, in place of soya lecithin as dispersant, Example 4 used a methyl methacrylate/2-methyl-5-vinyl pyridine (90/10) copolymer. This composition was prepared in a generally similar fashion but used the sand-stirring technique of Example 1 rather than the ball-milling technique of Example 2.

All of the compositions were then filtered, deaerated, coated, magnetically oriented, dried and calendered by procedures like those previously described. Details of the compositions and properties of the magnetic recording members produced from them are given in Table 1.

Table 1

| | Example 3 | Example 4 | Control A |
|---|---|---|---|
| Composition: | | | |
| $CrO_2$, percent by weight | 70.1 | 72.9 | 71.9 |
| Binder portion, percent by weight | | | |
| (a) Polyesterpolyurethane elastomer | 35.6 | 30.8 | 41.5 |
| (b) Vinyl copolymer hard resin | 35.6 | 30.8 | 41.5 |
| (c) Polyol | | | |
| (1) Hydroquinone | 14.3 | None | None |
| (2) Glycerol | None | 13.5 | None |
| (d) Isocyanate-terminated hydroxyl-reactive compound | 5.8 | 5.0 | 6.7 |
| (e) Dispersant | | | |
| (1) Soya lecithin | 8.8 | None | 10.2 |
| (2) Methyl methacrylate copolymer | None | 18.9 | None |
| (f) Stearamide lubricant | None | 1.1 | None |
| Properties: | | | |
| Blocking, revolutions | n.d.* | 10 | n.d. |
| Stability | | | |
| $\Delta\phi_r$ after 1 day, 65°F., 50% RH | −2.9% | n.d. | −4.8% |
| $t_{10}$, days, as earlier defined | n.d. | 4.3 | n.d. |

*n.d. = no data

EXAMPLES 5-7

These compositions all employed about 75% by weight of the chromium dioxide of Example 1. The other ingredients and the procedures used were also the same as for Example 1, but the proportions of components were altered, although in all cases the ratio of preformed elastomer to hard resin was retained at 1/2.5. Details of the compositions and properties of the magnetic recording members made from them are given in Table 2.

Table 2

| | Example 5 | 6 | 7 |
|---|---|---|---|
| Composition: | | | |
| $CrO_2$, percent by weight | 74.0 | 74.0 | 75.7 |
| Binder portion, percent by weight: | | | |
| (a) Preformed elastomer of Example 1 | 19.0 | 18.3 | 18.1 |
| (b) Vinyl terpolymer hard resin of Example 1 | 47.5 | 45.4 | 45.3 |
| (c) Hydroxyl-terminated polyester of Example 1 | 7.1 | 7.1 | 7.8 |
| (d) Isocyanate-terminated hydroxyl-reactive compound of Example 1 | 14.3 | 14.2 | 15.5 |
| (e) N-tallow trimethylene diamine dioleate dispersant of Example 1 | 2.9 | 5.7 | 3.1 |
| (f) Isopropyl myristate lubricant | 3.6 | 3.6 | 3.9 |
| (g) Olive oil lubricant | 5.7 | 5.7 | 6.2 |
| Properties: | | | |
| Blocking, revolutions | 15 | 18 | 18 |
| Gross wear, $\mu''$/min. | 0.01 | 0.7 | 0.25 |
| Output, db. relative to standard | −2.9 | −0.1 | −1.9 |
| Stability, $t_{10}$, days | 19.2 | 18.8 | n.d. |

EXAMPLES 8–11

These examples, made from ingredients and by procedures previously described, contained a still higher percentage of ferromagnetic chromium dioxide. All of them used 77.4% by weight of chromium dioxide prepared according to U.S. Pat. No. 3,278,263 and aftertreated according to U.S. Pat. No. 3,512,930. The binder composition was uniform for these examples, as follows:

| | |
|---|---|
| Preformed elastomer of Example 1 | 17.1% |
| Hard resin of Example 1 | 42.7% |
| Hydroxyl-terminated polyester of Example 1 | 8.5% |
| Isocyanate-terminated hydroxyl-reactive compound of Example 1 | 17.1% |
| N-tallow trimethylene diamine dioleate | 3.4% |
| Isobutyl myristate | 4.3% |
| Olive oil | 6.8% |

These examples further illustrate the versatility of the invention in that the compositions, essentially identical as to their components, were made with a variety of solvents, as follows:

Example 8 — cyclohexanone/toluene (2/1)

Example 9 — tetrahydrofuran/methyl isobutyl ketone/cyclohexanone (38/34/28)

Example 10 — tetrahydrofuran alone

Example 11 — cyclohexanone/toluene (2/1)

Properties of the magnetic recording members made from these compositions are given in Table 3.

Table 3

| | Example 8 | 9 | 10 | 11 |
|---|---|---|---|---|
| Blocking, revolutions | 17 | 17 | n.d. | 17 |
| Friction | 0.22 | 0.22 | 0.33 | n.d. |
| Gross wear, $\mu''$/min. | 0.02 | 0.04 | 0.04 | 0.11 |
| Output db. relative to standard | +0.1 | −0.9 | −1.9 | −0.9 |
| Stability | | | | |
| $D_7$, % loss in $\phi_r$ | 4.1 | n.d. | n.d. | n.d. |
| $t_{10}$, days | n.d. | n.d. | n.d. | 20.5 |

These examples illustrate the highly desirable properties of magnetic recording members made according to this invention, notably excellent blocking performance, low friction, unusually low wear and remarkably high output, all combined with a high level of stability of magnetic characteristics.

EXAMPLES 12–19

These examples illustrate other useful compositions, and other useful ingredients for such compositions, all with 78% of ferromagnetic chromium dioxide, made and aftertreated as already described. All were made by procedures like those used for the preceding examples, but with the addition that the calendered tapes were held for 20 hours at 65° C. before testing. Details of the compositions and properties of the magnetic recording members made from the compositions are given in Table 4. In addition to the properties shown in the table, these recording members as a group were characterized by excellent resistance to blocking, still frame life in excess of two hours, and good stability under accelerated aging conditions($D_7 = -8\%$ of initial $\Phi_r$).

Table 4

| | Example 12 | 13 | 14 | 15 | 16 | 17 | 18 | 19 |
|---|---|---|---|---|---|---|---|---|
| Binder composition, nearest percent by weight: | | | | | | | | |
| (a) Preformed elastomer of Example 1 | 20 | 24 | 24 | 24 | 24 | 24 | 26 | 26[1] |
| (b) Vinyl terpolymer hard resin of Example 1 | 37[2] | 32 | 32 | 32 | 32 | 32 | 34 | 34[3] |
| (c) Hydroxyl-terminated polyester of Example 1 | 8 | 8 | 8 | 8 | 8 | 8[3] | 8 | 8 |
| (d) Isocyanate-terminated hydroxyl-reactive compound of Example 1 | 17 | 17 | 17 | 17 | 17 | 17 | 17 | 17 |
| (e) Soya lecithin | 10 | 10 | 10 | 10 | 10 | 10 | 4[4] | 4 |
| (f) Butyl stearate | 8 | 8 | 8 | 4 | 4 | 8 | None | None |
| (g) Stearamide | None | 0.4 | None | None | 0.4 | None | None | None |
| (h) Isopropyl myristate | None | None | None | 4 | 4 | None | 4 | 4 |
| (i) Olive oil | None | None | None | None | None | None | 7 | 7 |
| Properties: | | | | | | | | |
| Head wear, $\mu$m/hr | 5 | 0.7 | 0.3 | 2 | 3 | 1 | 0.7 | 4.9 |
| Runnability, constant running/start-stop | | | | | | | | |

Table 4-continued

| | Example 12 | 13 | 14 | 15 | 16 | 17 | 18 | 19 |
|---|---|---|---|---|---|---|---|---|
| 85° C. | B/C | A/A | B/A | B/B | C/A | B/B | B/B | C/C |
| 45° C. | n.d. | B/A | B/A | n.d. | D/A | n.d. | C/A | n.d. |
| Wear, one-meter test, % signal retained | 69 | 76 | 73 | 78 | 76 | 86 | 92 | 80 |

[1]Preformed polyesterpolyurethane of Example 2
[2]Vinylidene chloride/acrylonitrile copolymer of Example 2
[3]Strongly branched reaction product of triols and dibasic acids, e.g., adipic and phthalic, hydroxyl number = 390–420, MW = about 450
[4]N-tallow trimethylene diamine dioleate

EXAMPLE 20

This example shows an integral recording member, i.e., the magnetic composition was formed into a self-supporting film. The ingredients and procedures of previous examples were used, except that the composition was not coated on a polyethylene terephthalate film base. Instead, it was coated with a doctor knife having a clearance of 0.015 inch on a sheet of polypropylene film. After the coating had dried, the polypropylene film was stripped away to leave a self-supporting film of the magnetic composition. For comparative purposes, Control B, a composition representative of the prior art, was similarly prepared and cast into a self-supporting film. Details of the compositions and properties of the magnetic recording members made from them are given in Table 5.

Table 5

| | Example 20 | Control B |
|---|---|---|
| Composition: | | |
| $CrO_2$, percent by weight | 79.5 | 78.5 |
| Binder portion, percent by weight: | | |
| (a) Preformed elastomer of Example 1 | 15.5 | 27.7 |
| (b) Vinyl terpolymer hard resin of Example 1 | 38.8 | 68.7 |
| (c) Hydroxyl-terminated polyester of Example 1 | 9.7 | None |
| (d) Isocyanate-terminated hydroxyl-reactive compound of Example 1 | 19.4 | None |
| (e) N-tallow trimethylene diamine dioleate | 3.9 | 3.6 |
| (f) Isopropyl myristate | 4.9 | None |
| (g) Olive oil | 7.8 | None |
| Properties: | | |
| Friction | 0.32 | 0.40 |
| Gross wear, $\mu''$/min. | 0.16 | 15.0 |
| Output, db. relative to standard | −3.9 | −5.9 |

It will be seen that the recording member of the invention has significantly improved magnetic properties as compared with the control, but that its most outstanding characteristic is the remarkable improvement in wear resistance. Further, it will be seen from the friction data that this difference cannot be attributed only to the lack of lubricants in the control sample, but results from the toughness that is characteristic of the compositions and members of this invention that combine a preformed elastomer, a preformed hard resin, a polyol and a hydroxyl-reactive compound.

From the foregoing it will be seen that magnetic recording compositions and magnetic recording elements made therefrom containing ferromagnetic chromium dioxide in a binder that comprises a preformed elastomer, a preformed hard resin, a polyol, and a polyfunctional hydroxyl-reactive compound, all according to this invention, possess a high and stable level of magnetic characteristics, and particularly they have significantly improved durability and runnability as compared with prior art compositions and members. The high quality and long wear life of the recording members of this invention recommend them for use in flexible recording media, such as magnetic tapes for audio and instrumentation recording, and especially for uses where rigorous wear conditions are encountered, as in various computer applications and in helical-scan video recording. The compositions of the invention are also useful for the manufacture of magnetic drums, discs, and the like, where wear life is not so important as for tapes, but where a high and stable level of magnetic properties is very desirable.

What is claimed is:

1. In a magnetic recording composition of the type comprising a plurality of ferromagnetic chromium dioxide particles dispersed in a polymeric resin binder, the improvement wherein said binder is formed by the reaction of a polyol and a polyfunctional hydroxyl-reactive compound in the presence of a preformed elastomer and a preformed hard resin; said polyol being selected from the group consisting of linear or branched aliphatic diols and triols, polymeric carboxylic esters having a molecular weight greater than 200 and hydroxyl numbers in the range of 1 to 500, and addition polymers having available pendant reactive hydroxyl groups; said preformed elastomers being selected from the group consisting of natural rubber, butadiene/acrylonitrile copolymers; block copolymers of butadiene/styrene; polychloroprene; chlorosulfonated polyethylene; and preformed non-reactive polyetherpolyurethanes and polyesterpolyurethanes; and said preformed hard resin being selected from the group consisting of epoxy and phenoxy resins, polycarbonates; polyesters; polyacrylic and polymethacrylic acids and esters thereof, cellulose ethers and esters, styrene polymers and copolymers, polyamides, vinyl polymers and copolymers, vinylidene polymers and copolymers, copolymers of two or more vinyl, vinylidene or acrylic monomers and mixtures thereof; the total binder composition comprising 1 to 25% by weight of polyol, 2.5 to 30% by weight of polyfunctional hydroxyl-reactive compounds, 10 to 60% by weight of preformed elastomers and 25 to 70% by weight of preformed hard resin.

2. The magnetic recording composition of claim 1 wherein said preformed elastomer is a preformed, non-reactive polyurethane.

3. The magnetic recording composition of claim 2 wherein said preformed, nonreactive polyurethane is selected from the group consisting of polyesterpolyurethane and polyetherpolyurethane elastomers.

4. The magnetic recording composition of claim 2 wherein said preformed, nonreactive polyurethane is an organosoluble polyesterpolyurethane based on diphenylmethane diisocyanate, adipic acid and an alkanediol having 2–4 carbon atoms or mixtures of such alkanediols.

5. The magnetic recording composition of claim 1 wherein said preformed hard resin is a nonelastomeric, macromolecular film forming organic polymer selected from the group consisting of vinylidene chloride/acrylonitrile and vinyl chloride/vinyl acetate copolymers.

6. The magnetic recording composition of claim 1 wherein said binder contains from about 3.5 to about 55% by weight of said reaction product.

7. The magnetic recording composition of claim 6 wherein said polyol is selected from the group consisting of linear or branched aliphatic diols and triols, polymeric carboxylic esters, and addition polymers having available pendant reactive hydroxyl groups.

8. The magnetic recording composition of claim 6 wherein said polyfunctional hydroxyl-reactive compound is a polyfunctional isocyanate.

9. The magnetic recording composition of claim 8 wherein said polyfunctional isocyanate is selected from the group consisting of hexamethylene diisocyanate, diphenyl-methane diisocyanate, diphenylmethane triisocyanate, toluene diisocyanate, polyethylene polyphenylisocyanate, the $C_{36}$ diisocyanate from linoleic dimer acids, 4,4'-methylene-bis-(cyclohexylisocyanate), and the product of 2,4-toluene diisocyanate and trimethylolpropane reacted in a ratio in the range of about 3 to 1 to about 5 to 2.

10. The magnetic recording composition of claim 1 wherein said binder comprises about 15 to about 40% by weight of said preformed elastomer, about 30 to about 60% by weight of said preformed hard resin and about 5 to about 40% by weight of said reaction product.

11. The magnetic recording composition of claim 10 wherein said preformed elastomer comprises an organosoluble polyesterpolyurethane resin based on diphenylmethane diisocyanate, adipic acid and an alkanediol having 2–4 carbon atoms or mixtures of said alkanediols; said preformed hard resin is selected from the group consisting of vinylidene chloride/acrylonitrile and vinyl chloride/vinyl acetate copolymers; said polyol is a polymeric carboxylic ester; said polyfunctional hydroxyl-reactive compound is the product of 2,4-toluene diisocyanate and trimethylolpropane reacted in a ratio in the range of about 3 to 1 to about 5 to 2; and said ferromagnetic particles are particles of acicular chromium dioxide.

12. In a process for making a magnetic composition of the type comprising admixing about 1 to about 98% by weight of ferromagnetic chromium dioxide particles with about 2 to about 99% by weight of a binder composition, the improvement wherein said ferromagnetic chromium dioxide particles are mixed with a mixture of a preformed elastomer, a preformed hard resin, a polyol and a polyfunctional hydroxyl-reactive compound in a manner such that said polyol and said polyfunctional hydroxyl-reactive compound react to form a reaction product after their admixture with the other ingredients; said polyol being selected from the group consisting of linear or branched aliphatic ciols and triols, polymeric carboxylic esters having a molecular weight greater than 200 and hydroxyl numbers in the range of 1 to 500, and addition polymers having available pendant reactive hydroxyl groups; said preformed elastomers being selected from the group consisting of natural rubber, butadiene/acrylonitrile copolymers; block copolymers of butadiene/styrene; polychloroprene; chlorosulfonated polyethylene; and preformed non-reactive polyetherpolyurethanes and polyesterpolyurethanes; and said preformed hard resin being selected from the group consisting of epoxy and phenoxy resins, polycarbonates; polyesters; polyacrylic and polymethacrylic acids and esters thereof, cellulose ethers and esters, styrene polymers and copolymers, polyamides, vinyl polymers and copolymers, vinylidene polymers and copolymers, copolymers of two or more vinyl, vinylidene or acrylic monomers and mixtures thereof; the total binder composition comprising 1 to 25% by weight of polyol, 2.5 to 30% by weight of polyfunctional hydroxyl-reactive compounds, 10 to 60% by weight of preformed elastomers and 25 to 70% by weight of preformed hard resin.

13. The process of claim 12 wherein said preformed elastomer is a preformed, nonreactive polyurethane.

14. The process of claim 13 wherein said preformed, nonreactive polyurethane is selected from the group consisting of polyesterpolyurethane and polyetherpolyurethane elastomers.

15. The process of claim 13 wherein said preformed, nonreactive polyurethane is an organosoluble polyesterpolyurethane based on diphenylmethane diisocyanate, adipic acid and an alkanediol having 2–4 carbon atoms or mixtures of such alkanediols.

16. The process of claim 12 wherein said preformed hard resin is a nonelastomeric, macromolecular film forming organic polymer, selected from the group consisting of vinylidene chloride/acrylonitrile and vinyl chloride/vinyl acetate copolymers.

17. The process of claim 12 wherein said polyol is selected from the group consisting of linear or branched aliphatic diols and triols, polymeric carboxylic esters, and addition polymers having available pendant reactive hydroxyl groups.

18. The process of claim 12 wherein said polyfunctional hydroxyl-reactive compound is a polyfunctional isocyanate.

19. The process of claim 18 wherein said polyfunctional isocyanate is selected from the group consisting of hexamethylene diisocyanate, diphenylmethane diisocyanate, diphenylmethane triisocyanate, toluene diisocyanate, polyethylene polyphenylisocyanate, the $C_{36}$ diisocyanate from linoleic dimer acids, 4,4'-methylene-bis-(cyclohexylisocyanate), and the product of 2,4-toluene diisocyanate and trimethylol-propane reacted in a ratio of about 3 to 1 to about 5 to 2.

20. The process of claim 12 wherein said binder composition comprises about 15 to about 40% by weight of said preformed elastomer, about 30 to about 60% by weight of said preformed hard resin, about 2 to about 15% by weight of said polyol, and about 3.0 to about 25% by weight of said polyfunctional hydroxyl-reactive compound.

21. The process of claim 20 wherein said binder contains about 5 to about 40% by weight of said reaction product.

22. The process of claim 21 wherein said magnetic composition contains from about 65 to about 85% by weight of said ferromagnetic chromium dioxide particles.

23. The process of claim 22 wherein said preformed elastomer comprises an organosoluble polyesterpolyurethane resin based on diphenylmethane diisocyanate, adipic acid and an alkanediol having 2-4 carbon atoms or mixtures of such alkanediols; said preformed hard resin is selected from the group consisting of vinylidene chloride/acrylonitrile and vinyl chloride/vinyl acetate copolymers; said polyol is a polymeric carboxylic ester; said polyfunctional hydroxyl-reactive compound is the product of 2,4-toluene diisocyanate, and trimethylolpropane reacted in a ratio of about 3 to 1 to about 5 to 2; and said ferromagnetic particles are particles of acicular chromium dioxide.

* * * * *